United States Patent [19]

Lavoie

[11] Patent Number: 4,766,846
[45] Date of Patent: Aug. 30, 1988

[54] SYSTEM AND METHOD FOR THE CULTURE OF MOLLUSKS

[75] Inventor: Jean-Pierre Lavoie, Charlesbourg, Canada

[73] Assignee: Aquiculture Climax Concept Inc., Quebec, Canada

[21] Appl. No.: 916,371

[22] Filed: Oct. 7, 1986

[51] Int. Cl.⁴ .............................................. A01K 61/00
[52] U.S. Cl. ............................................ 119/4; 119/3
[58] Field of Search ..................................... 119/2, 3, 4

[56] References Cited

U.S. PATENT DOCUMENTS

| | | | |
|---|---|---|---|
| 3,909,971 | 10/1975 | Wilde | 119/4 X |
| 4,257,350 | 3/1981 | Streichenberger | 119/3 |
| 4,351,268 | 9/1982 | Blair et al. | 119/3 |
| 4,377,987 | 3/1983 | Satre | 119/4 |

FOREIGN PATENT DOCUMENTS

| | | | |
|---|---|---|---|
| 944639 | 4/1974 | Canada . | |
| 948505 | 6/1974 | Canada . | |
| 963327 | 2/1975 | Canada . | |
| 1017210 | 9/1977 | Canada . | |
| 137087 | 4/1985 | European Pat. Off. | 119/4 |
| 730331 | 4/1980 | U.S.S.R. | 119/4 |

Primary Examiner—Robert P. Swiatek
Attorney, Agent, or Firm—Foley & Lardner, Schwartz, Jeffery, Schwaab, Mack, Blumenthal & Evans

[57] ABSTRACT

A system for the culture of mollusca especially oysters or for collecting mollusca larvae in a water stretch. This system is characterized by the presence of a source of gas under pressure, an inflatable and deflatable floatation device, a conduit connecting the gas source to the floatation device, a mechanism for the introduction of gas under pressure into the floatation device in order to inflate it and for the removal of gas from the floatation device in order to deflate it and fastenings associated with the floating device attaching the latter to a grid constituted of a three dimensional grid type arrangement of culture baskets or of a group of mollusca larvae collectors. The invention also relates to a method for the culture of mollusca, specially oysters in a water stretch, characterized by the following steps: (a) introducing mollusca strains in screen baskets thereby permitting the water to circulate freely through each basket; (b) disposing the baskets containing mollusca strings in a three dimensional grid type arrangement hereinafter called grid; (c) fixing an inflatable and deflatable gas floating device to the grid and varying the quantity of air into the floating device in such a way as to simply submerge the grid or allowing it to rest on the bottom of the water stretch.

15 Claims, 6 Drawing Sheets

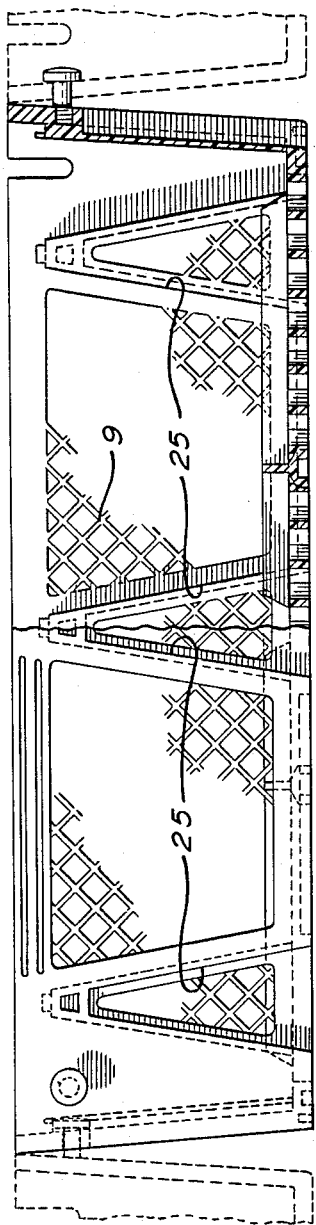
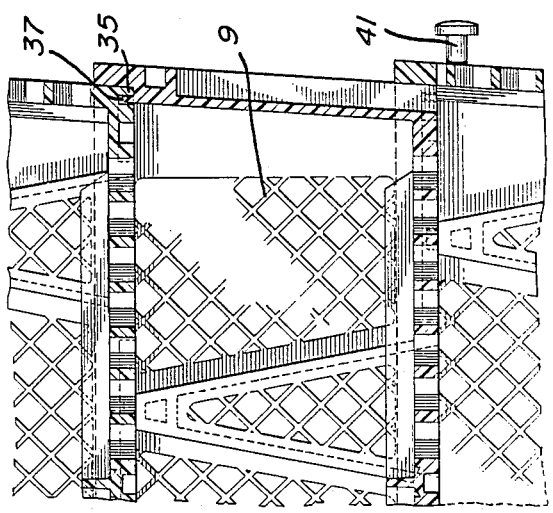
Fig. 4
Fig. 5

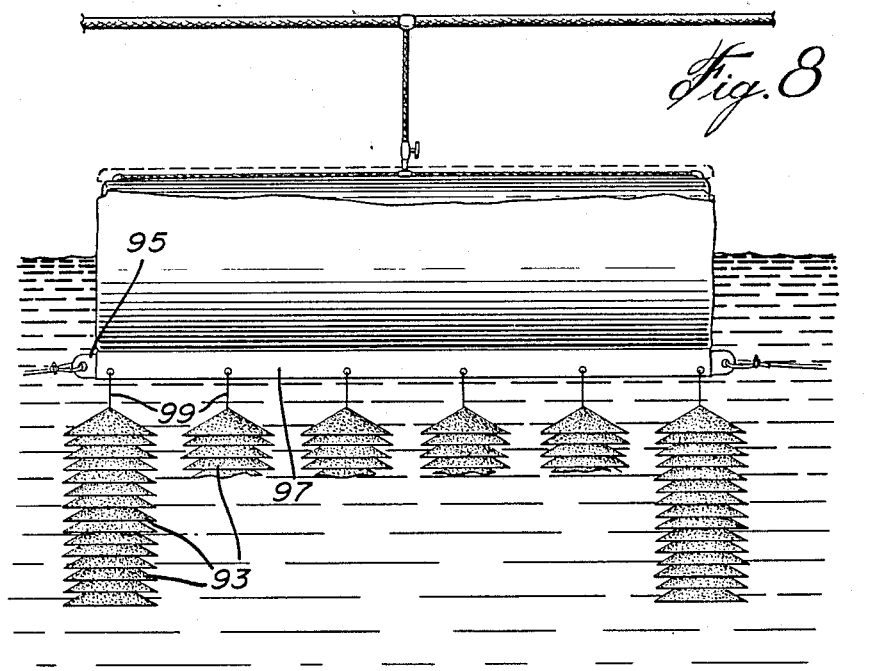
Fig. 8
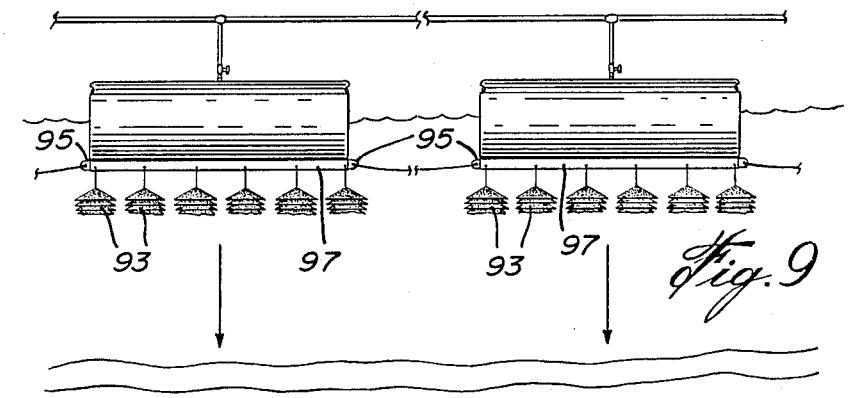
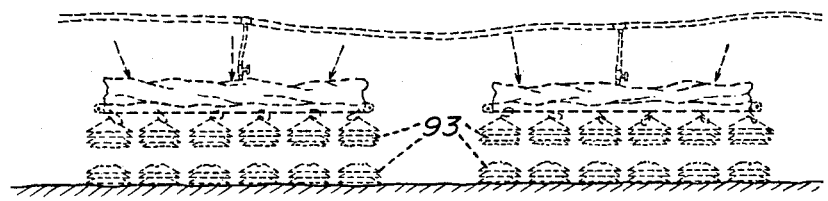
Fig. 9

SYSTEM AND METHOD FOR THE CULTURE OF MOLLUSKS

The present invention relates to a system and a method for the culture of mollusca, especially oysters, scallops, mussels and other, or collecting mollusca larvae. More specifically, the invention relates to the culture of mollusca with a yield of approximately 100%.

It is known that the raising of oysters and other mollusca as well as the collection of larvae is taking place mainly in the sea where the mollusca and the larvae grow and find their food. Most of the time, mollusca strains are placed in trays or baskets so arranged to promote the growing of oysters while preventing the action of predators. On the other hand, mainly in regions where the climate is severe ice formation at the surface of the sea may cause heavy damages to mollusca cultures. Evidently, all sort of solutions have been advanced to remedy those drawbacks, but to our knowledge, no suitable technique has yet been developed to overcome such drawbacks.

Canadian Pat. No. 944,639 issued Apr. 2, 1974 to Lazare N. Halaunbrenner describes a floating tray, the main characteristic being to maintain said tray immersed in middle water by attaching its bottom part to a ballast lying on the bottom of the sea.

Canadian Pat. No. 948,505 issued June 4, 1974 to Vanguard Industries, Inc. describes a very particular grid for the raising of mollusca. This grid is attached to a floater constituting a guide mark.

Canadian Pat. No. 963,327 issued Feb. 25, 1975 to Douglas McNicol and Denys River describes a basket for the culture of oysters of a very particular style which has nothing to do with the floatation of the grid type arrangement of baskets of the present invention.

Canadian Pat. No. 1,017,210 issued Sept. 13, 1977 to Kenneth G. Lawrence describes another specific type of basket.

U.S. Pat. No. 3,909,971 issued Oct. 7, 1975 to Frank W. Wilde describes a floating basket.

U.S. Pat. No. 4,377,987 issued Mar. 29, 1983 to Alf R. Satre describes a very specific system for the raising of oysters.

Nothing in the above-mentioned literature suggests the possibility of increasing the yield in the culture of oysters or in the collection of mollusca larvae, while getting rid of the problem of predators. In addition, it has not yet been possible to obtain an excellent yield and to overcome the problem associated with ice formation.

It is therefore a feature of the present invention to produce a grid permitting to obtain a better yield in the growing of mollusca, and to get rid of the problem ice formation in severe climate.

Another feature of the present invention is the development of a system which permits the mollusca breeder of, for example, oysters to work on his production with ease and without any undue cluttering.

Another feature of the present invention consists in the use of a floating device in combination with a grid of baskets for the growing of mollusca to obtain a much better yield.

Another feature of the present invention consists in the development of a device enabling collect mollusca larvae.

In order to overcome the above-mentioned drawbacks, and with reference to the various features of the invention, I have developed a system for the culture of mollusca especially oysters or for the collection of mollusca larvae in a water stretch, in other words for an industrial device to be maintained suspended at a certain level or to be allowed to rest on the bottom of the water stretch. This system is characterized by a source of gas under pressure, a an inflatable and deflatable gas floatation device, a conduit connecting the gas source to the floatation device, means to introduce the gas under pressure in the floatation device in order to inflate it and to remove the gas from the floating device in order to deflate it, and attaching means associated with said floatation device enabling attachment of said floatation device to the industrial device for example made of a grid of culture baskets or a group of mollusca larvae collectors.

The invention also relates to a method for the culture of mollusca, especially oysters in a water stretch, characterized by the following steps:
 (a) introducing mollusca strains in screen baskets thereby permitting water to circulate freely through each basket;
 (b) disposing the baskets containing mollusca strains in a three dimensional grid type arrangement;
 (c) fixing an inflatable and deflatable gas floating device to the grid and varying the quantity of air into the floating device in such so as to merely submerge the grid or to allow it to rest at the bottom of the water stretch.

The invention will now be described as illustrated without any limitation thereof with reference to the attached drawings in which, FIG. 1 is a side view of a system for the culture of oysters according to the present invention;

FIG. 4 is a side view of a basket showing the attachment with other baskets on a same level;

FIG. 5 is another side view showing the device for superimposing of the baskets;

FIG. 8 shows a system of the present invention applied to the collection of mollusca larvae, and FIG. 9 is an overall view of the system illustrated in FIG. 8 in a floating position and, in dotted line, in submerged position.

Figure 1:
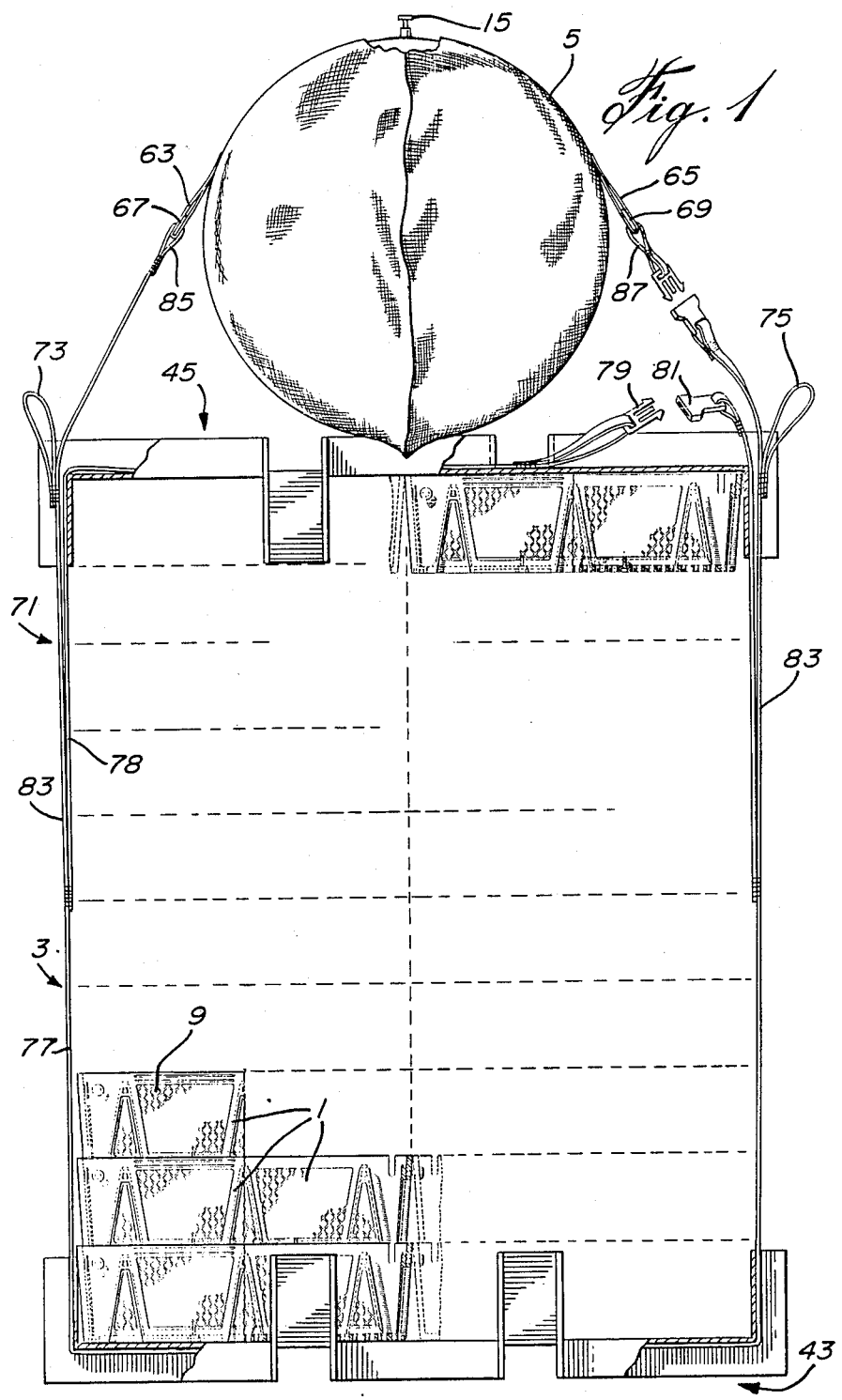

Referring now to the drawings, more particularly to FIG. 1, it will be noticed that the system for the culture of oysters which is illustrated essentially comprises a specific number of baskets 1 for the growing of oysters constituting a grid 3, and a balloon 5 which will be described in more details later on.

Since the culture and the growth of oysters are taking place in aqueous media, preferably at sea, where they find their food, it is obvious that water must freely circulate through each of the basket designed for the growth of the oysters. For this purpose, the baskets are so constructed to integrate a screen which will now be described. As seen in the drawings, each basket is rectangular, and in the illustrated embodiment, it is exactly square. The bottom of each basket is made of a screen 7 and each of the sides is a screen 9. Finally, the baskets 1, constituting the grid 3 are constructed to be stacked one on top of the other as well as to be linked together on a same horizontal plane as it is seen more particularly in FIGS. 1, 4 and 5. The construction details allowing such an arrangement of the baskets 1 in the grid 3, will be described in details later on, more particularly with reference to FIGS. 4 and 5.

The interesting feature of the present invention resides in the fact that the whole system may be simply submerged in clear weather or be deeply submerged when the weather conditions produce ice at the surface of the sea. For this purpose, there must be provided a conventional source 11 of gas under pressure to which the balloon 5 is connected. In the illustrated system, a conventional conduit 13 is used to connect the source 11 of gas under pressure 11 to the balloon 5.

In order for the system of the present invention to be used in a submerged position or in a deeply submerged position, as the case may be, the balloon 5 should be inflated or deflated, as required. This is achieved by the use of a valve 15 of conventional construction which permits the introduction of air under pressure, or its removal, as the case may be, whether the balloon has to be inflated or deflated in order to submerge or sink the system of the present invention.

Referring now to FIGS. 1, 3, 4 and 5, the baskets 1 which constitute the essential components of the grid 3 will now be described in detail.

It has been mentioned above that the bottom of the basket is made of a screen 7 and each of the sides comprises a screen 9. In the illustrated model, the bottom has been divided in nine equal square sections.

Figure 3:
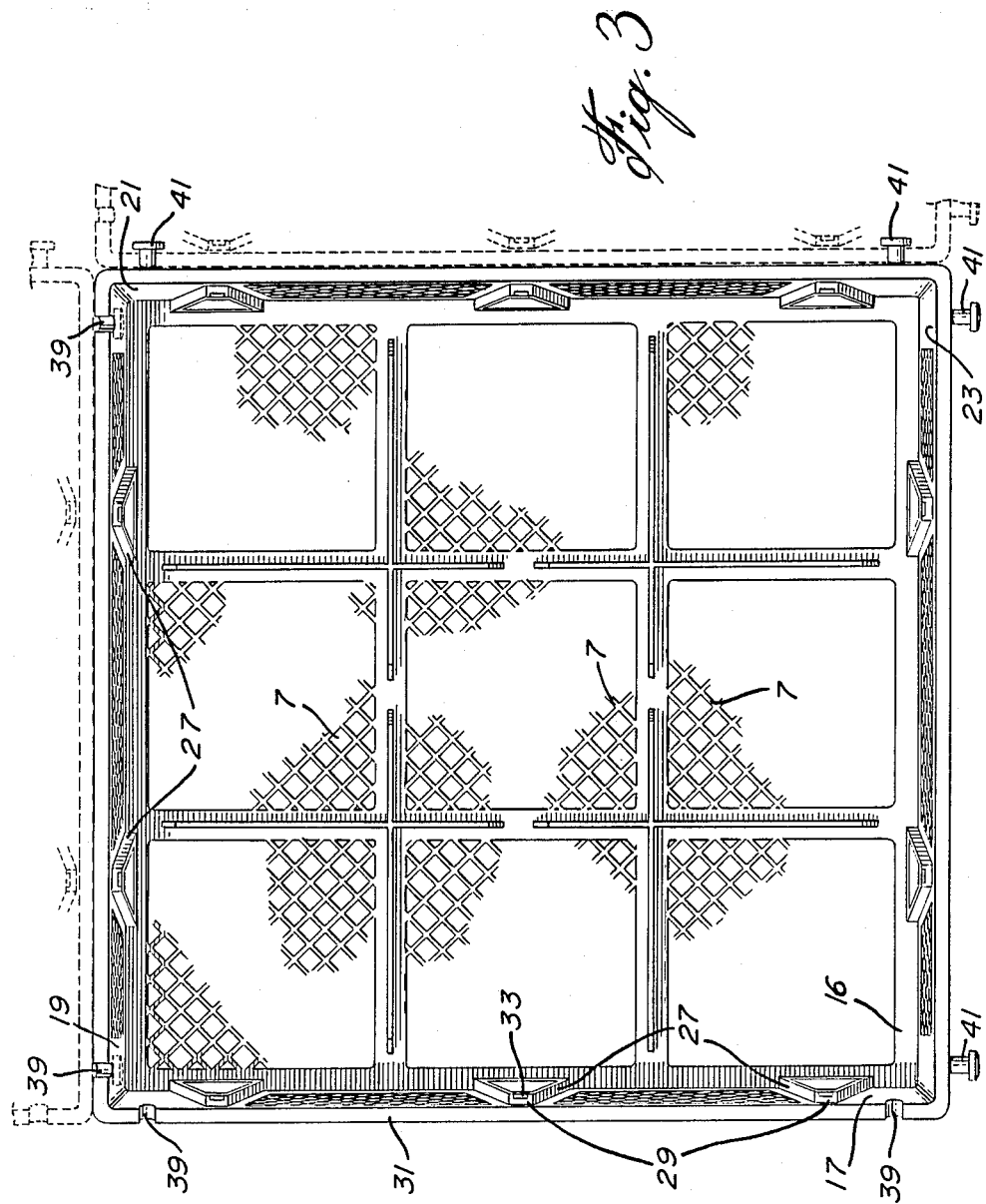
FIG. 3 is a top view of one of the baskets of the grid.

FIGS. 3, 4 and 5 show that the sides of a basket 1 are lightly widened out thereby permitting to insert one basket into another to store them away. However, it is essential that they may be stacked as seen in FIGS. 1 and 3 when in use in the grid 3. On the other hand, once stacked as shown in FIG. 1, it is also essential that the baskets be anchored together on a same level.

In other words, each basket 1 is rectangular and is made of a bottom 16, and four sides 17, 19, 21 and 23. The top part is obviously open, and, as mentioned earlier, the bottom and the four sides comprise screens capable of retaining the mollusca, while allowing free water circulation therethrough. As seen in FIGS. 3, 4 and 5, the four sides 17, 19, 21 and 23 are lightly widened out. Referring to FIG. 4, hollow triangular depressions 25 are provided on the exterior faces of the four sides 17, 19, 21 and 23. On the other hand, triangular projections 27 are formed on the interior faces of the same sides 17, 19, 21 and 23 corresponding to triangular depressions 25. In practice, three hollow triangular depressions 25 and three triangular projection 27 will be found on each face 17 and 21. On faces 19 and 23, two embossed triangular projections 27 and two hollow triangular depressions 25 will be found. The arrangement of these projections and depressions 25,27 is such that in a given position, two baskets may be inserted one into the other; that is, the projections 27 are inserted in the hollow depressions 25 of the abovelocated basket. However, after a rotation of a quarter of a turn of one basket with respect to the other, into another position, the two baskets remain superimposed one over the other. Indeed, considering FIG. 3, it will be noted that the top part of each triangular projection 27 is terminated by a support shoulder 29, which is recessed internally with respect to the top edge 31 of the corresponding side of basket 1. It will also be noted that the support shoulder 29 also comprises a tab 33 the purpose of which will be given later on.

Between each hollow triangular depression 25, the lower edge 35 on each side of the basket 1 is formed of a shoulder comprising a groove 37. It will be noticed that this shoulder will rest on the support shoulder 29 as a result of the combined action of the tab 33 and the groove 37 which fit into one another.

On the other hand, as it is also essential that the baskets 1 be attached to one another in the same plane, namely laterally, there are provided notches 39 on two adjacent top edges of each of the baskets, whereas fixation pins 41 are provided at the top edge of the other two sides, more precisely on the exterior faces thereof as illustrated in FIGS. 3, 4 and 5. These fixation pins 41 are constructed to be inserted in the notches 39 of adjacent baskets in such a way that all the baskets of a given level attached together by means of fixation pins 41 and notches 39 form a rigid arrangement. The grid is built up by stacking the baskets using support shoulders 29 and shoulders 35 and they are attached together on a given level by using the fixations pins 41 and the notches 39. The baskets 1 formed into a grid, rest on the base 43 and are covered with a holding device 45, the whole assembly being tightly surrounded by a belt which will be described in detail later on. It will be noted on the other hand that this belt is also fixed to the balloon as shown in FIG. 1, in such a way as to hold the cell or grid attached to the balloon through this belt.

Figure 2:
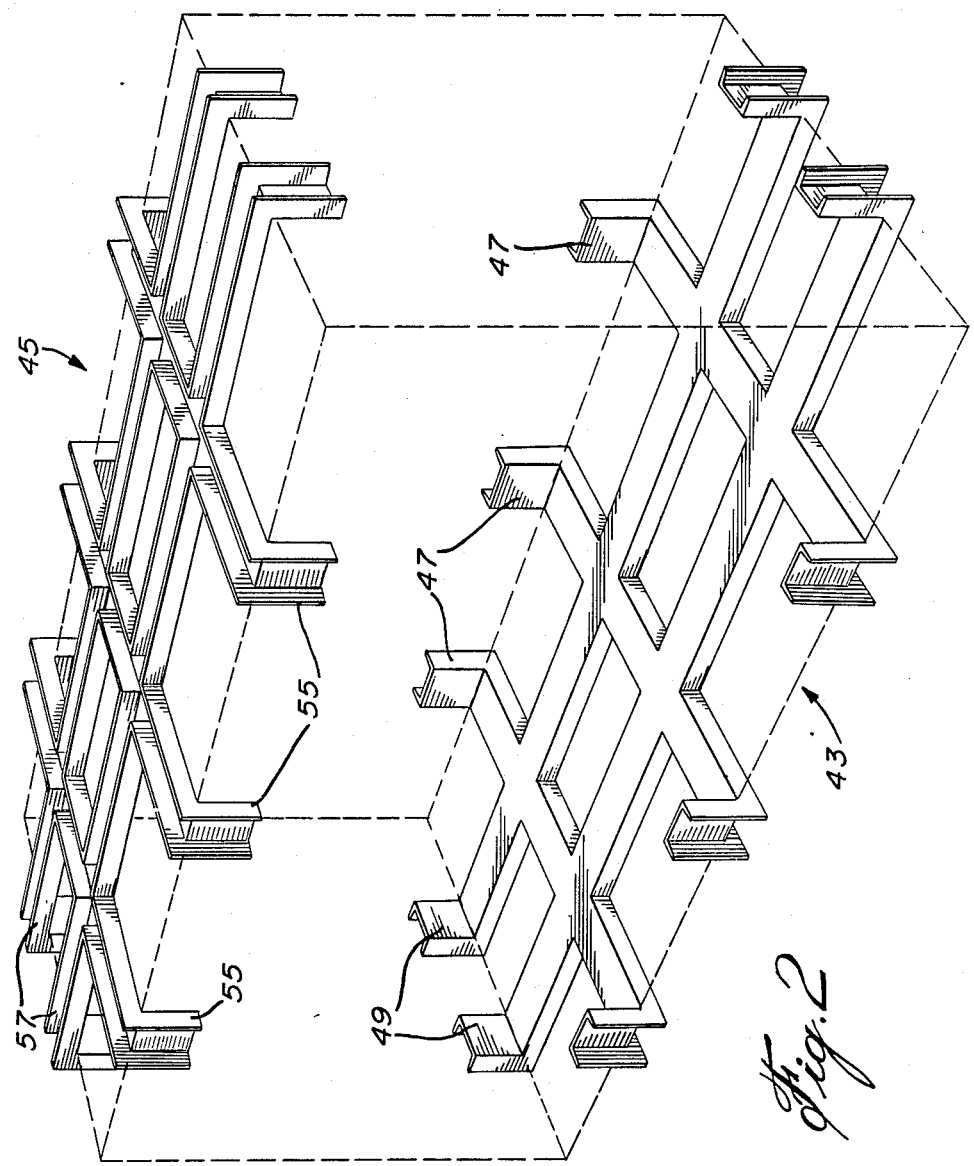
FIG. 2 is a perspective view of the basket holding system constituting the grid.

Referring now to FIG. 2, it will be noticed that the base 43 comprises a first group of U-shaped supports 47 transversely disposed under the stacking of baskets, not shown in FIG. 2. A second group of U-shaped supports 49 is disposed longitudinally under that same stacking of baskets. In order to have a rigid assembly, the two groups of support 47 and 49 are formed from a single piece preferably by molding. As shown, the supports intersect at right angles to constitute the base 43 of the grid of baskets 1.

As for the holding device 45, shown in FIG. 2, it will be seen that it comprises a first group of inverted U-shaped holding pieces 55 disposed transversely on the stacking of baskets (not illustrated in FIG. 2). A second group of inverted U-shaped holding pieces 57 is disposed longitudinally on the same stacking of baskets. The holding pieces 55,57 are similar to supports 47,49 and are also formed of a single element, such as by molding.

Figure 6:
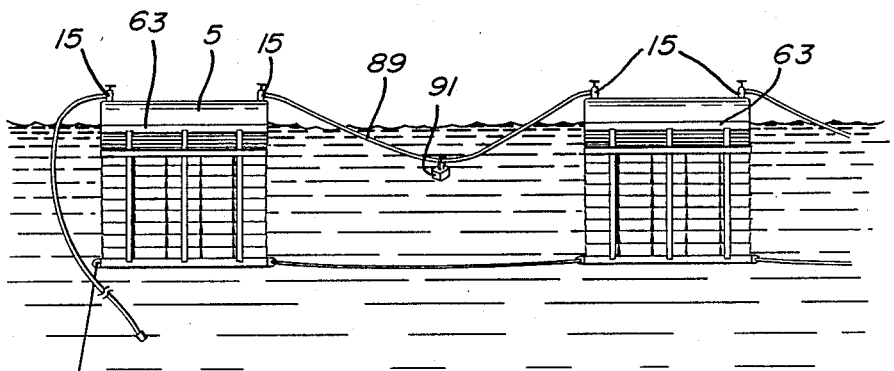
FIG. 6 is an overall view showing a system according to the present invention in floating position and in dotted line, the same system being submerged.

Before describing the construction of the grid with baskets 1, base 43, holding device 45 and the belt, it is important to give some details about the balloon, especially with reference to FIGS. 1 and 6 of the drawings.

It will be realized that the ballon 5 is of an elongated bag shape. Symmetrically located on each side of the balloon, are two longitudinal sleeves 63,65. These sleeves are made of the same material as the one used for the fabrication of the balloon. Each sleeve 63,65 extends along balloon 5, as shown on FIG. 6 of the drawings. Each of the sleeves 63,65 contains a suspension structural piece 67,69 of an elongated form. It will be seen later how these suspension structural pieces 67,69 contained in the sleeves 63,65 distribute the tension of attachment points on the whole of the floater.

Referring again to FIG. 1, it is generally shown, that the grid 3 is attached to the balloon 5 by means of a belt assembly 71 which is divided to constitute an attachment to the suspension structural pieces 67,69 as well as holding rings 73,75, all as well illustrated in the drawings.

The belt assembly 71 comprises a first section 77 which surrounds the base 43. A second section 78, fixed along section 77, goes over the holding device 45, and is buckled on the upper part of the grid by using attachments 79,81, in a conventional manner.

Along the first section 77, approximately in the middle of the grid 3, made of the baskets 1, the base 43 and the holding device 45, there is an extension 83 of the first section, the upper ends 85,87 of which are ring shaped, and are fixed in known manner to the suspension structural piece 67, 69. At the top of the grid 3, as mentioned above, the section 83 is sub-divided as to form holding rings 73,75 which are used for handling the grid 3.

Figure 7:
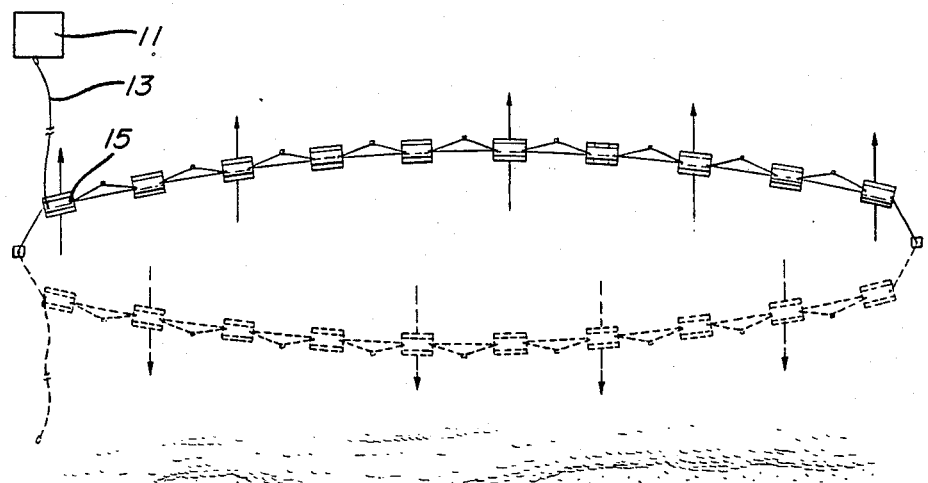
FIG. 7 shows the movement of the system of the present invention with the tide.

When it is desired to use a plurality of systems according to the present invention, as illustrated in FIGS. 6 and 7, it is preferable to provide a valve 15 at both ends of the balloon 5. In addition, a conduit 89 connects each of the balloons 5. It is recommended to add ballast 91 so that the conduit is partially immerged into the water thereby providing a better disposed assembly.

The system according to the present invention may also be used for the suspension of larvae collectors 93 as shown on FIGS. 8 and 9 of the drawings. In this case, it is preferred to use a single suspension structural piece 95 mounted in a sleeve 97 provided at the base of the balloon as illustrated in FIGS. 8 and 9. The larvae collectors 93 are stacked in the manner shown on FIGS. 8 and 9 and each stacking is attached to the sleeve 95 by means of a thread 99.

The method for the culture of mollusca, especially oysters, according to the present invention is very simple, and using the apparatus according to the present invention, comprises the following steps. Mollusca strains are introduced in the baskets 1, which as indicated above, are constructed of screens in order to allow free circulation of water through each of these baskets. Thereafter, the baskets containing the mollusca strains are formed as a unit to finally constitute a grid 3, after the baskets have been stacked and attached to one another, and have been disposed on a base 43. The holding device 45 on top of the baskets and the whole assembly is tied by means of the belt 71. The grid 3 is then fixed to the balloon 5 as illustrated in FIG. 1 and a sufficient amount of air is introduced in the balloons if it is desired to simply submerge the unitary cell, whereas the balloons are deflated at a convenient pressure, if it is desired that the system rest on the bed of the water stretch when there is formation of ice at the surface, or the system could be suspended in middle water with an appropriate anchorage thereby constituting a reserve from which a given species of marine organism can be cultivated. The system could also be used with any industrial object to be maintained suspended at a given level, or which is simply intended to be laid on the bottom.

The same method is applicable to the collection of larvae; it is only necessary to replace the grid 3 by the collectors 93.

It is within the ambit of the present invention to cover any obvious modifications of the system described herein, provided such modifications are within the scope of the appended claims.

I claim:

1. A system for the culture of mollusca, especially oysters, in a water stretch, comprising:
    an inflatable and deflatable elongated balloon, to be connected to a source of gas under pressure by means of a conduit connecting said gas source and said balloon;
    means enabling introduction of gas from said source under pressure into said balloon to inflate the balloon, and means for removing said gas from said balloon to deflate the balloon;
    a grid of baskets containing mollusca strains to be kept in suspension at any level or to rest on the bottom of the water stretch;
    means enabling said grid to be merely submerged when the balloon is inflated, and to rest on the bottom of the water stretch when said balloon is deflated;
    attaching means associated with said balloon enabling connection of the balloon to said grid of baskets;
    each basket being rectangular, the top part being open, the bottom and all sides thereof comprising screen material to permit free circulation of water through said baskets;
    means for connecting together adjacent sides of two neighboring baskets;
    said grid of baskets including a base, a plurality of said baskets laterally connected together at said adjacent sides and stacked over one another in a plurality of rows of baskets, said plurality of baskets being disposed on said base, holding means placed over said plurality of baskets, and a belt assembly tightly surrounding said base and said holding means, said belt assembly being fixed to said balloon in order to enable said balloon to hold said grid by means of said belt assembly.

2. System as claimed in claim 1, wherein said base comprises a first group of U-shaped supports transversely disposed under a stack of said baskets and a second group of U-shaped supports disposed longitudinally under said stack of said baskets, the supports of the first group being unitary with said supports of the second group and crossing each other to constitute said base.

3. System as claimed in claim 2, wherein the holding means comprises a first group of inverted U-shaped pieces disposed transversely on the stack of baskets and a second group of inverted U-shaped pieces disposed longitudinally on said stack of said baskets, said pieces of the first group being unitary with said pieces of the second group and crossing each other.

4. System as clamed in claim 1, wherein the elongated balloon is provided with two symmetrically disposed longitudinal sleeves, a suspension structural piece being inserted in each said sleeve, said grid of baskets being attached to said balloon through said suspension structural pieces.

5. System as claimed in claim 4, wherein said belt assembly is divided to constitute an attachment to the suspension structural pieces.

6. System as claimed in claim 5, wherein said belt assembly comprises a first section surrounding said base, a second section fixed along the first section and buckling up on top of said grid, and an extension of the first section whose end is fixed to the suspension structural piece and buckles up to provide a desired tension, said extension being provided with a holding ring near the top of the grid.

7. System as claimed in claim 6, wherein notches are formed on two of the top edges of each of the baskets, fixation pins are provided on exterior sides opposed to said edges in order to fit in the notches of adjacent baskets, all the baskets on the same level forming a rigid assembly.

8. System as claimed in claim 7, wherein means are provided to stack the baskets on top of one another when these are constituted into said grid, and to insert them into one another by simple rotation of a quarter of a turn of one basket in relation to another when it is desired to store them.

9. System as claimed in claim 8, wherein the four sides are lightly widened out, hollow triangular depressions being provided on the exterior faces of the four sides and corresponding triangular projections being formed on the internal faces of the same sides, the arrangement of said projections and said depressions being such that in a given position two baskets could be inserted into one another, and after a quarter of a turn rotation of one basket in relation to another in another position, the two baskets are stacked on top of one another.

10. System as claimed in claim 9, wherein two of the sides are each provided with three external hollow triangular depressions identically disposed on said two sides and three internal triangular projections corresponding to said three hollow triangular depressions, the other two sides each comprising two external hollow triangular depressions and two internal triangular projections corresponding to each other but not corresponding to the three hollow triangular depressions and the three triangular projections provided on the two first sides.

11. System as claimed in claim 10, wherein the top part of each triangular projection is terminated by a support shoulder internally recessed in relation to the top edge of the corresponding side of said basket, whereas between each hollow triangular depression, the bottom edge of each side of said basket is formed of a shoulder resting on the shoulder support of a non-corresponding side.

12. System as claimed in claim 1, wherein the means enabling the introduction of a gas under pressure in said balloon comprises a valve mechanism.

13. System as claimed in claim 12, which comprises a gas conduit connected between said valve mechanism and said gas source to permit introduction in, or the removal of the gas under pressure from, said balloon when the latter is at least partially submerged.

14. System as claimed in claim 13, comprising a valve mechanism at each end of the balloon.

15. System as claimed in claim 14, which comprises several grids and corresponding balloons, each grid begin suspended from a respective balloon, the balloons being attached together by gas conduits permitting the inflation or deflation of all balloons.

* * * * *